United States Patent [19]

Brunnett et al.

[11] Patent Number: 5,602,693

[45] Date of Patent: Feb. 11, 1997

[54] METHOD AND APPARATUS FOR SENSING POSITION IN A DISK DRIVE

[75] Inventors: Don Brunnett, Agoura; Ashok K. Desai, West Lake Village, both of Calif.

[73] Assignee: Micropolis (S) PTE Ltd., Singapore, Singapore

[21] Appl. No.: 355,649

[22] Filed: Dec. 14, 1994

[51] Int. Cl.⁶ .................................................. G11B 5/596
[52] U.S. Cl. ........................................ 360/77.08; 360/77.02
[58] Field of Search .............................. 360/78.14, 77.08, 360/77.05, 77.02

[56] References Cited

U.S. PATENT DOCUMENTS

| | | | |
|---|---|---|---|
| 4,636,885 | 1/1987 | Yamada et al. | 360/77.08 X |
| 4,660,191 | 4/1987 | Maeda et al. | |
| 4,669,004 | 5/1987 | Moon et al. | 360/77.08 X |
| 4,775,968 | 10/1988 | Ohsato. | |
| 4,910,617 | 3/1990 | Brunnett et al. | 360/77.08 X |
| 4,949,201 | 8/1990 | Abed. | |
| 5,153,787 | 10/1992 | Sidman | 360/77.05 |

Primary Examiner—Aristotelis Psitos
Assistant Examiner—James L. Habermehl
Attorney, Agent, or Firm—Poms, Smith, Lande & Rose

[57] ABSTRACT

A system for positioning a plurality of heads traversing multiple disks in a disk drive system is disclosed herein. The positioning system includes a servo pattern recorded on at least one of the hard disks, the servo pattern having a sequence of servo locations successively recorded along concentric tracks on the disks. Burst zones are also recorded on the hard disks, each burst zone having multiple transitions recorded at staggered separate radial distances from the center of the disks. The positioning system contains means for computing servo burst signal magnitudes based on head position relative to the transitions in each burst zone, and means for calculating a head offset based on differences between the servo burst signal magnitudes and radial displacement of each head in each track. The positioning system transmits a correction signal based on calculated head position, and the output signal has a linear response for any head position on the disk.

20 Claims, 6 Drawing Sheets

METHOD AND APPARATUS FOR SENSING POSITION IN A DISK DRIVE

FIELD OF THE INVENTION

This invention generally relates to hard disk drive systems, and more particularly to such systems utilizing servo information recorded on a disk surface for controlling the position of data read/write heads, and the accuracy in positioning such heads.

BACKGROUND OF THE INVENTION

Typical hard disk drive systems record information on circular disks, each disk having a multiplicity of tracks concentrically located thereon. Each disk drive normally contains a plurality of disks, each disk recording surface having one or more magnetic heads which transfer information to or from an external system. Each magnetic head is located on an arm, and all arms are aligned vertically and attached to a common head positioner assembly. The head positioner assembly is driven by a motor so that the arms and magnetic heads move uniformly across the surfaces of the vertically aligned disks. Head positioner assemblies are usually mounted to rotate the arms and magnetic heads along an arcuate path over the disks.

In normal operation, a host controller issues a track seek command. The controller electronics respond to the track seek command, determining the direction and magnitude of movement necessary to drive the heads from their current position to the destination position. Hard disks are generally divided into a plurality of concentric tracks, and data is read or written along each track. Further, position of the head on each disk, position of data on each disk, and the desired destination for arm movement is indicated by track indices. High performance disk drive units typically attempt to maximize the density at which tracks are written. In order to achieve higher densities, the positioner motor is energized, and the data read/write head counts the number of tracks it crosses until it reaches the destination. For example, if the head is at track 25, and the electronics require movement to track 256, the data head must read 231 track crossings. The drive motor accelerates to a maximum value for a calculated period of time and decelerates so that it attains zero velocity on reaching the destination.

Typically, the carriage on which the heads are mounted is incorporated in a servo system, which performs the necessary positioning functions. Three different types of servo systems exist: a dedicated servo system, which has servo information located on one of many disk surfaces, an embedded servo system, wherein each data surface is used to store the servo information, and the hybrid servo system, which uses a dedicated disk surface and a low sample rate embedded servo on each data surface to store servo information. The servo system senses the position of the heads by means of servo signals recorded in tracks on the disk surfaces. Embedded servo and hybrid servo system accuracy and data storage has been the object of developments within the disk drive field, as the accuracy at which the head can be made to follow the track centerline determines the density of the tracks located on a disk. The closer the head can be made to follow the track centerline, the closer together the tracks can be spaced on the disk, and storage efficiency increases.

A typical hard disk used in an embedded servo or hybrid servo system has a plurality of outwardly radiating "spokes" representing servo data. Each set of sectors between "spokes" represents zones where data is stored. Servo signals are typically arranged in frames, including an AGC field, sync mark, cylinder information, and servo burst information. Typically, four radially extending servo burst groups, designated A, B, C, and D, are used to assist in positioning the heads, as the signals generated by the heads in reading these four burst groups determine the radial position of the head.

Track centerline positions are determined by the system by comparing the servo burst signals received. That is, knowing the placement of servo burst data on the disk, the position of a head traversing a track can be calculated from the signals received.

Previous systems employing multiple servo burst groups used the following equation to determine position information:

$$\frac{(A-B)}{(A+B)}$$

Alternately, various calculations using C and D in the denominator have been used, or constant value scale factors, to determine head position. The drawback of these systems was the requirement to calibrate for demodulator offsets, demodulator gains and head width variations, as well as the inherent nonlinearities associated with ratios of sums and differences. Demodulator gains include any imprecision in head positioning due to various gains applied to the sum and difference ratios used to determine position information. Gain rounding or inaccuracies adversely affected head positioning. With respect to demodulator offset, signals received must be demodulated to recover position information and convert it into the appropriate position signal for use by the position servo. This demodulation and conversion tends to create dc offsets which may be introduced into the position signal. With respect to head variations, strength of the signal generated in the servo transducer is a function of the actual gap width of the servo transducer, which affect the magnitudes of the servo burst signals (A, B, C, or D) received, introducing error into calculations which use these servo burst signals. Further, prior compensation schemes were inherently nonlinear, introducing unwanted position movement into the system.

Accordingly, it is an object of the current invention to provide an embedded or hybrid servo system having accurate head positioning capability.

It is another object of the current invention to compensate for demodulator offsets and head width variations in positioning data read/write heads. Signals received must be demodulated to recover position information and convert it into the appropriate position signal for use by the position servo. This demodulation and conversion tends to create dc offsets which may be introduced into the position signal. With respect to head variations, strength of the signal generated in the servo transducer is a function of the actual gap width of the servo transducer, which affects the magnitudes of the servo burst signals (A, B, C, or D) received. Thus, head variations must be minimized to avoid introducing error into calculations which use these servo burst signals.

It is still another object of the current invention to provide a linear head positioning system which does not cause unwanted position movement.

SUMMARY OF THE INVENTION

Accordingly, the present invention is broadly directed to a system for positioning read/write heads traversing over disks in a disk drive system. The positioning system includes a servo pattern recorded on at least one disk. The servo pattern has a sequence of servo locations successively recorded along a plurality of concentric tracks on the disks. The servo pattern also has a series of burst zones, each burst zone having multiple transitions recorded at staggered separate radial distances from the center of the disks, and each burst zone radially shifted from other burst zones. The system also has magnitude calculation means for computing servo burst signal magnitudes based on head position relative to the transitions in each burst zone. The invention further has signal determination means for calculating a head offset based on relative differences between servo burst signal magnitudes and radial displacement of each head in each track. Depending on the relative position of the head within a track, different burst amplitudes are received, and based on these amplitudes a correction signal based on calculated head offset is transmitted. The correction signal has a linear response for any head position on the disk.

In accordance with a further aspect of the current invention, the invention is more specifically directed to a system for positioning a plurality of heads traversing multiple disks in a disk drive system wherein the positioning system includes a servo pattern recorded on at least one of the hard disks. The servo pattern has a sequence of servo locations successively recorded along concentric tracks on the disks. Burst zones are also recorded on the hard disks, each burst zone having multiple transitions recorded at staggered separate radial distances from the center of the disks. The positioning system also comprises means for computing servo burst signal magnitudes based on head position relative to the transitions in each burst zone, and means for calculating a head offset based on differences between the servo burst signal magnitudes and radial displacement of each head in each track. The positioning system transmits a correction signal based on calculated head position, and the output signal has a linear response for any head position on the disk. The linear response reduces unwanted position movement.

In accordance with the current invention, signals received are demodulated to recover position information and convert the information into a position signal, and the current invention inhibits dc offsets. Further, head variations are minimized to avoid introducing error into calculations which use servo burst signals.

Other objects, features, and advantages of the present invention will become more apparent from a consideration of the following detailed description and from the accompanying drawings.

DESCRIPTION OF THE PREFERRED EMBODIMENT

Figure 1:
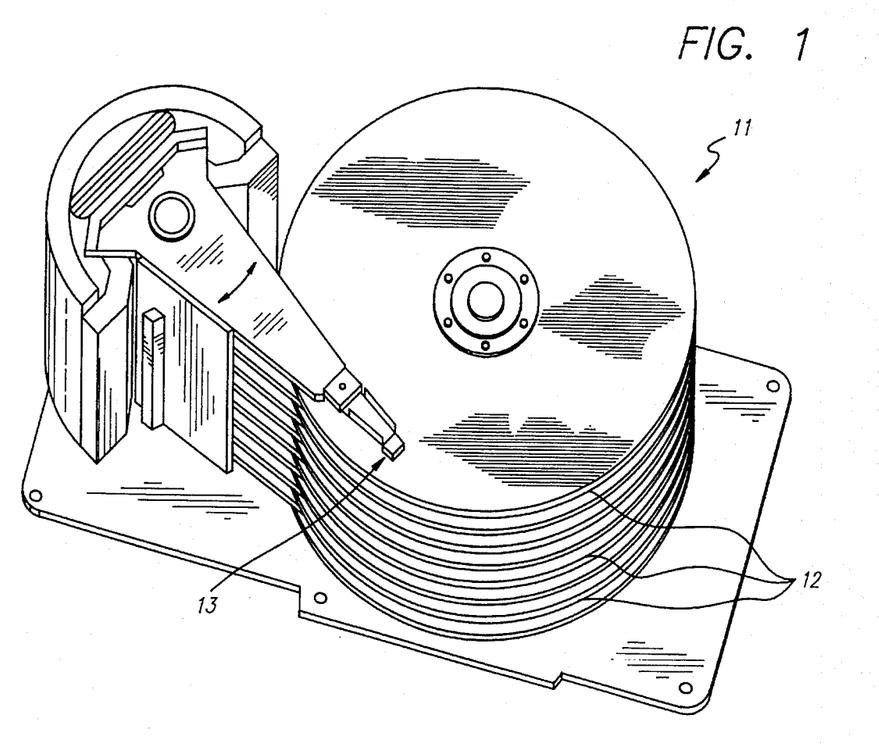
FIG. 1 illustrates a typical hard disk drive of the type in which the current invention is employed.

FIG. 1 presents an illustration of a typical hard disk drive 11. The hard disk drive consists of a head disk assembly, employing multiple disks 12, and a circuit board of controller electronics. Disks 12 may have information magnetically stored on the top and bottom surfaces. Data is read or written to the disks 12 using head 13.

Figure 2:
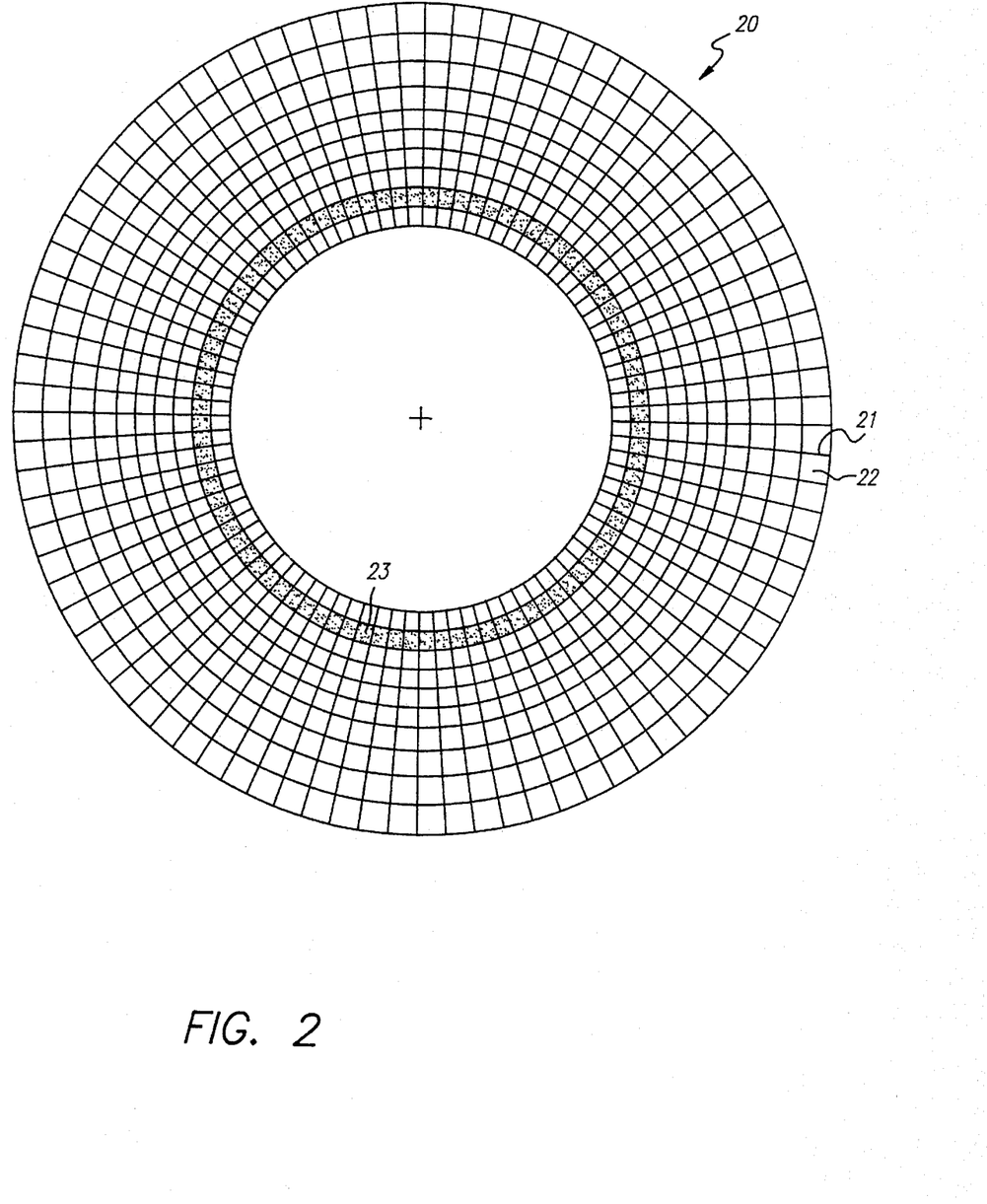
FIG. 2 shows a hard disk employed within a hard disk drive.
Figure 3:
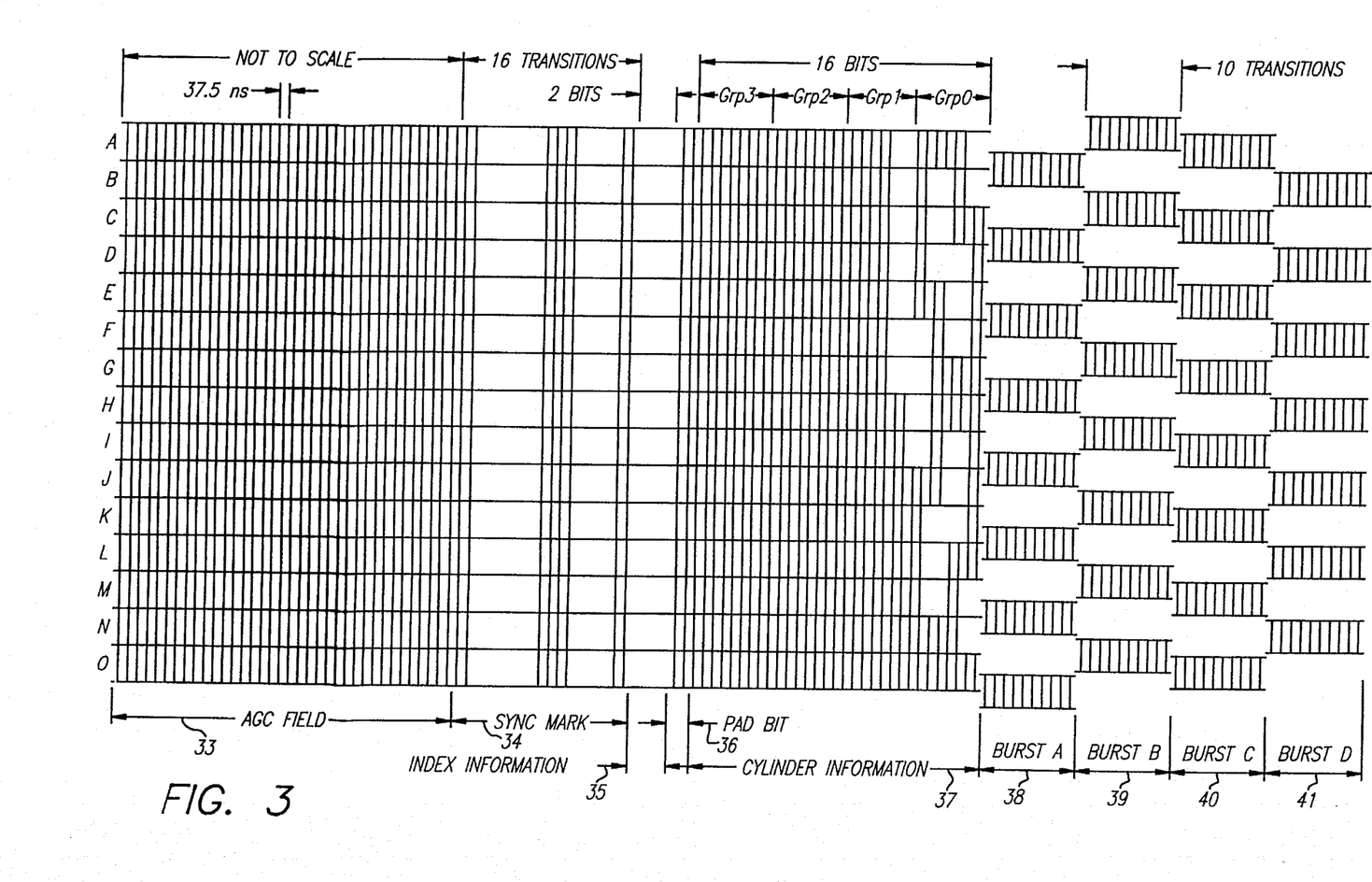
FIG. 3 presents the servo information contained within one "spoke" of a hard disk.

Embedded or hybrid servo systems employ hard disks having recorded thereon a plurality of "spokes" of servo data, illustrated in FIGS. 2 and 3. In FIG. 2, hard disk surface 20 contains multiple outwardly radiating servo data "spokes" 21, with user data stored in data storage zones 22 which are located between the "spokes" 21. Each data storage zone 21 located on hard disk 20 is located on a concentric data track 23.

FIG. 3 represents the data contained on a single servo data "spoke" 21 for fifteen separate tracks. Automatic gain control information is contained in AGC field 33, which has multiple 37.5 nanosecond transitions located therein. In order to synchronize the system, sync mark data 34 is located after AGC field 33. Two bits of index information 35 precede a pad bit 36. Subsequent to pad bit 36, four groups of cylinder information 37, comprising a total of 16 bits of data, are located on each data track A through 0. The critical positioning information follows this cylinder information 37. Four groups of burst data, burst A 38, burst B 39, burst C 40 and burst D 41, are located radially outward from the center of the disk. Each group of burst data 38, 39, 40, and 41 is offset from the other groups of burst data, and each group is uniformly radially positioned from the centerline of each track A through 0. Each burst group 38, 39, 40, and 41 consists of 10 transition signals, each 37.5 nanoseconds in duration. While the preferred embodiment of the current invention employs four burst groups having ten transitions per burst group per track, it is to be understood that a different number of burst groups or a different number of transitions may be employed. When a data head passes over burst A 38, burst B 39, burst C 40 and burst D 41, the data head reads burst information after receiving cylinder information 37. If the head is passing over the center of track 0 depicted in FIG. 3, the head will read the top of the ten transitions of burst A 38, thus providing an intermediate strength signal to the data head, the bottom of the ten transitions of burst B 39, another intermediate strength signal, the center of burst C 40, yielding a very strong signal to the data head, and the head will read none of the ten transitions of burst D 41, supplying a minimal strength signal to the data head. Based on these signals, data head position and correction factors can be determined. If the data head is off center from the desired track, such as positioned "low" on track 0, burst A 38 will provide the maximum strength signal to the head, while burst B 39 will provide a relatively low strength signal to the head. Based on the information received from the head passing over these burst transition fields, correction of head position occurs.

Previous systems employing multiple servo burst groups used the following equation to determine position correction information:

$$\frac{(A-B)}{(A+B)}$$

Alternately, various calculations using C and D in the denominator have been used, or constant value scale factors, to determine head position. The drawback of these systems was the inability to compensate for demodulator offsets, demodulator gain variations, and head width variations, as well as the inherent nonlinearities associated with ratios of sums and differences.

The present invention does not use summation (A+B) to determine the relative head position, but uses a scheme involving the differences between pairs of the four servo burst signals 38, 39, 40, and 41 depending on the position of the head on the track. The amplitude information from all four servo bursts is used to generate the fine position information and is combined with the cylinder information to generate a digital position signal that is linear across the entire disk surface. Depending on the track position, a different equation is used to determine the head position.

Figure 4A:
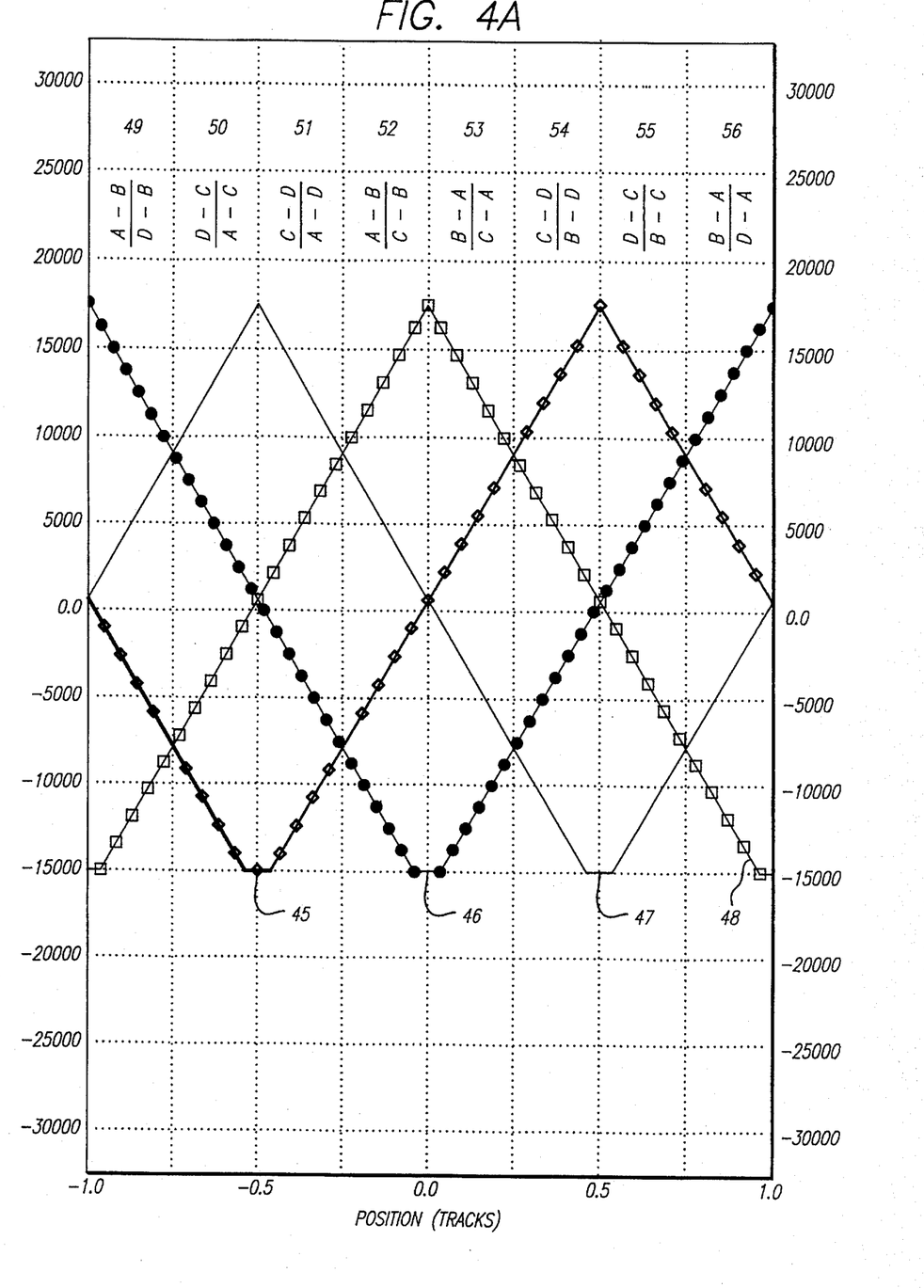
FIG. 4A is an illustration of burst amplitude received with respect to track position, and the corresponding calculations and transitions of the current system.

The passage of the heads over the four burst groups is shown in FIG. 4A, along with the equations producing linear system performance of head positioning. Data track centerlines are illustrated at every half-track position; that is, on the x-axis, data track centerlines occur at −1.0, −0.5, 0.0, 0.5, and 1.0. The y axis represents the position signal, in internal counts, received by the data head. Burst A 38 is illustrated graphically by A curve 47 in FIG. 4A. Burst B 39 is shown as B curve 45, burst C 40 shown by C curve 48, and burst D indicated by D curve 46. Taking, for example, A curve 47 and burst A 38, if the head is centered along the track, the magnitude of the signal received is approximately 0. When the head is at the uppermost portion of the track as shown in FIG. 3, or at 0.5 track position according to the x-axis of FIG. 4A, burst A 38 is at a minimum strength, corresponding to the minimum magnitude of A curve 47. When the head is at the lowermost portion of the track, or at −0.5 track position, burst A 38 is at maximum strength, corresponding to the minimum magnitude of A curve 47. As noted above and graphically presented in FIG. 4A, when the head is over the position of the track, burst A 38 and curve A 47 are at intermediate strength, burst B 39 and curve B 45 are at intermediate strength, burst C 40 and curve C 48 are at maximum strength, and burst D 41 and curve D 46 are at minimum strength.

Depending on the location of the head on the disk, the relative burst magnitudes will differ in magnitude. Depending on the strength of the individual burst signals received by the head and the position of the head within the track, a different equation is used to calculate the correction signal necessary to position the head based on burst signals received. FIG. 4A illustrates the variations in the amplitude of an embedded servo as a function of the radial displacement of the servo head. Track centerline positions are determined by the system by comparing the servo burst signals received. That is, knowing the placement of servo burst data on the disk, the position of a head traversing a track is calculated from the burst magnitudes received, and a correction signal, equal to the ratio of differences of appropriate magnitudes, is calculated. For example, if the position of the head is tending positive in track 0 of FIG. 3, burst C will be greatest, burst A and B will be intermediate, and burst D will be least. Comparisons of A and B indicate which side of the center position the track is located. If positive, burst signal B will be greater than burst signal A, and fifth compensation equation 53, having the form $$\frac{(B-A)}{(C-A)}$$

applies. If the head position is tending negative in this track, burst signal A will be greater than burst signal B, and the fourth compensation equation 52, having the form $$\frac{(A-B)}{(C-B)}$$

applies. The advantage of using the first through eighth compensation equations 49 through 56 in FIG. 4A is that such an implementation produces a continuous linear response across the surface of the disk, and the equations will always yield a positive result. Calibration of the signals becomes unnecessary, alleviating the demodulator offset and demodulator gain problems. Head width variations decrease, as signal strength varies proportionately when using ratios of differences rather than ratios of differences and sums.

Figure 4B:
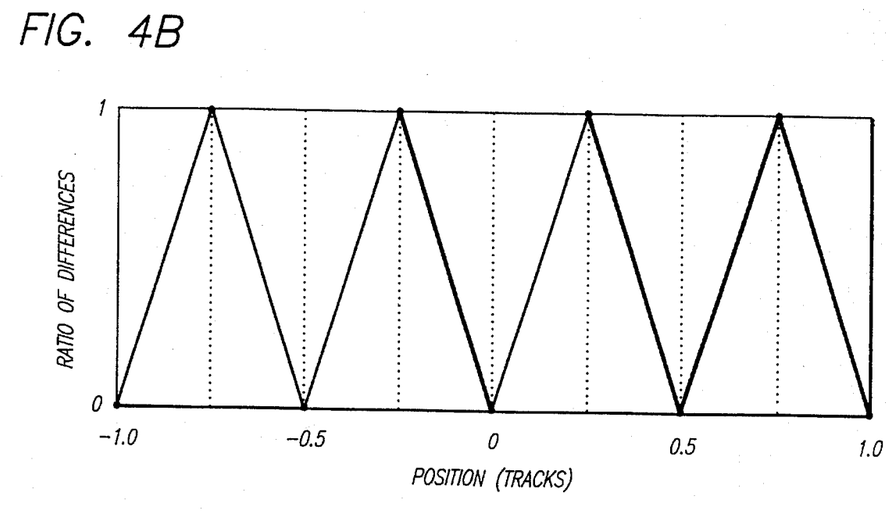
FIG. 4B represents the output or calculation result of the configuration of FIG. 4A.

FIG. 4B illustrates the result of the calculation made based on head position from FIG. 4A. If the head is at the center of the track marked 0.0, the result of either equation 52 or 53 from FIG. 4A yields a 0.0 result. The A curve 47 is equal to the B curve 45 value at this point, and thus the output of the system is 0.0. As a result, the signal transmitted for the ratio of the differences between the A, B, C, and D curves resembles the sawtooth curve depicted. Such a sawtooth configuration produces a linear response for the system, alleviating problems inherent in the prior art systems.

Figure 5:
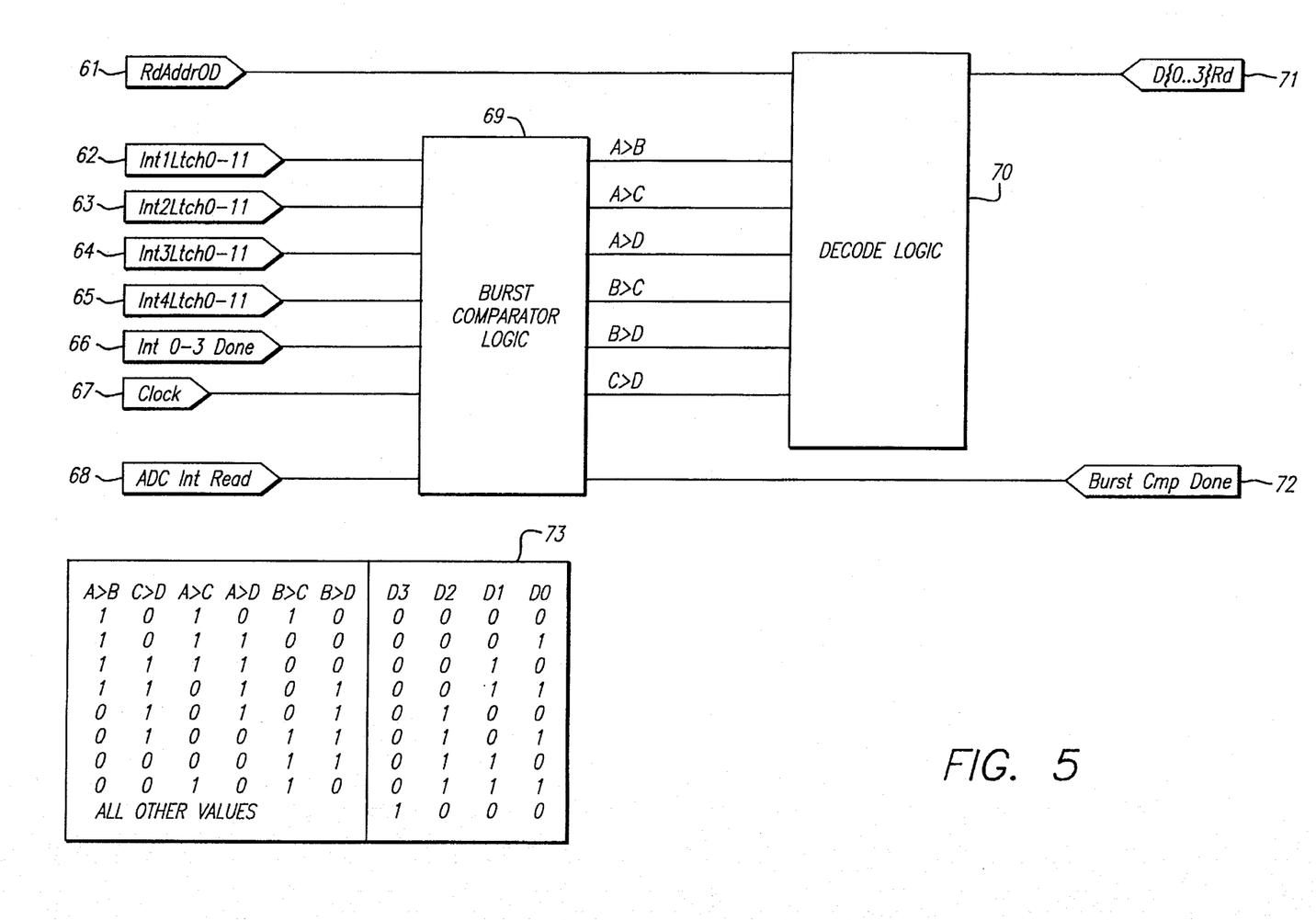
FIG. 5 presents the hardware implementation of the current invention.
Figure 6:
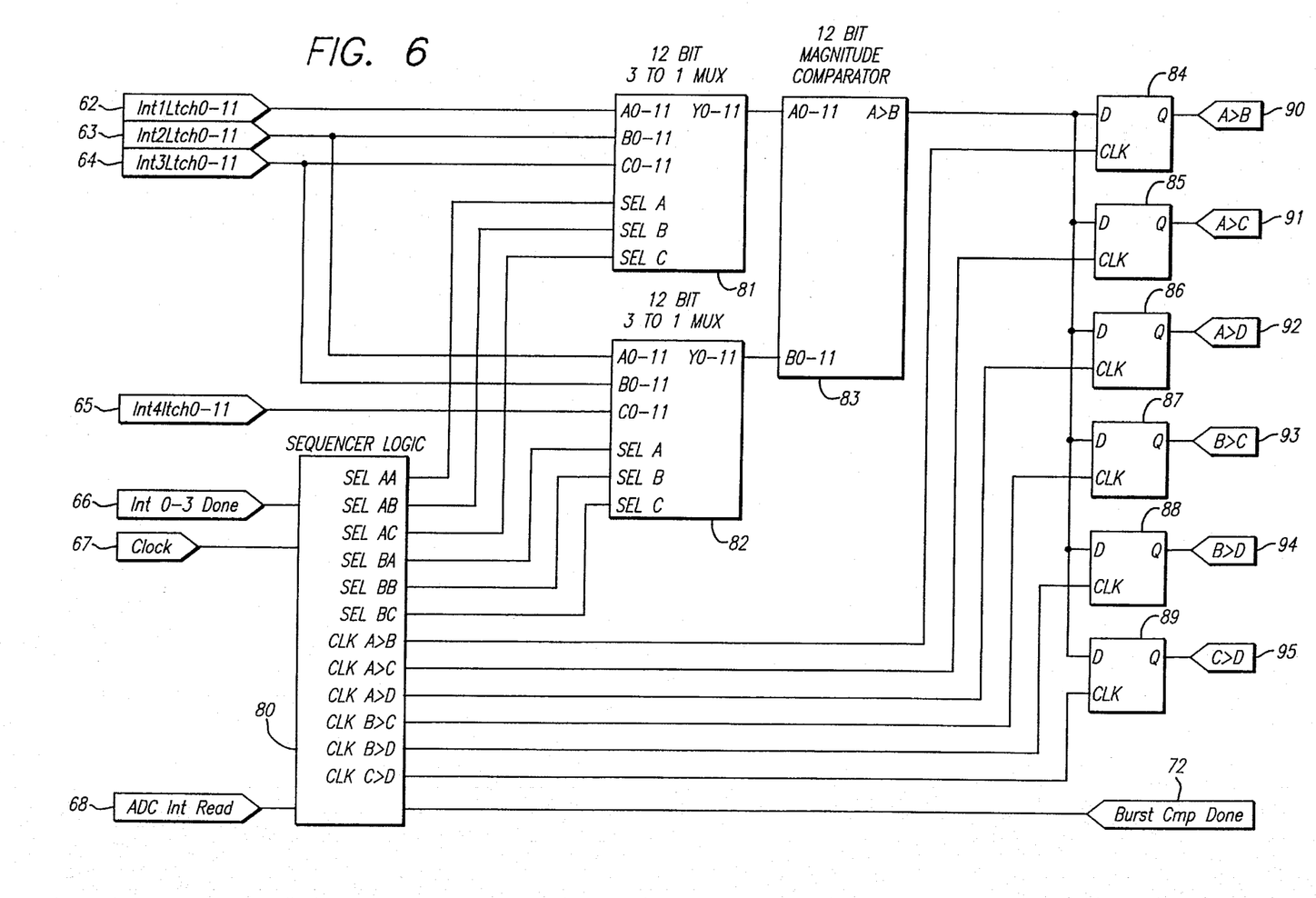
FIG. 6 illustrates the mechanization of the burst comparator logic circuit.

Hardware implementation of the inventive system is depicted in FIGS. 5 and 6. FIG. 5 presents the burst state detector circuitry, which includes burst comparator circuit 69. Burst comparator circuit 69 performs various comparisons to determine the relative magnitudes of the burst signals received by the data head. Inputs to burst comparator circuit 69 are clock 67 and first through fourth integer latches 62–65. First through fourth integer latches 62–65 present twelve bit raw data based on signals received from the data head on the transition strength received when the head passes over the four burst areas. Integer latch completion indicator 66 indicates when all burst data has been received, as if too little data is sampled then inadequate burst D data is available, while if too much data is sampled, user data may be incorrectly read as burst data. ADC integer read signal 68 provides sequencing selection information to burst comparator logic circuit 69.

Decode logic block 70 evaluates the results of burst comparator logic circuit 69 utilizing the logic provided in truth table 73. Read address offset indicator 61 provides the decode logic block 70 with the cylinder offset information. Output 71 from decode logic block 70 is the ratio of relevant burst magnitudes. Decode logic circuit 70 operates according to the procedure of Table 1. The logic shown in Table 1 presumes the existence of a software magnitude decoder within decode logic circuit 70.

TABLE 1

Decode Logic Operating Code

```
if (estimated velocity) < Burst Skip Velocity then
    if (C ≧ A) and (C ≧ B) then
        if (B ≧ A) then
            BrstPos = BrstMult * (B–A)/(C–A)
            if odd(CylCode) then
                BrstPos = BrstPos – CylOffst
        else
            BrstPos = – BrstMult * (A–B)/(C–B)
```

TABLE 1-continued

Decode Logic Operating Code

```
            if odd(CylCode) then
                    BrstPos = BrstPos + CylOffst
    else
        if (D ≧ A) and (D ≧ B) then
            if (A ≧ B) then
                BrstPos = BrstMult * (A–B)/(D–B)
                if even(CylCode) then
                    BrstPos = BrstPos – CylOffst
            else
                BrstPos = – BrstMult * (B–A)/(D–A)
                if even(CylCode) then
                    BrstPos = BrstPos + CylOffst
        else
            if (A ≧ B) then
                if (D ≧ C) then
                    BrstPos = – BrstMult * (D–C)/(B–C)
                    if odd(CylCode) then
                        BrstPos = BrstPos + BrstOffst
                    else BrstPos = BrstPos – BrstOffst
                else
                    BrstPos = BrstMult * (C–D)/(B–D)
                    if odd(CylCode) then
                        BrstPos = BrstPos + BrstOffst
                    else BrstPos = BrstPos – BrstOffst
            else
                if (C ≧ D) then
                    BrstPos = – BrstMult * (C–D)/(A–D)
                    if odd(CylCode) then
                        BrstPos = BrstPos – BrstOffst
                    else BrstPos = BrstPos + BrstOffst
                else
                    BrstPos = BrstMult * (D–C)/(A–C)
                    if odd(CylCode) then
                        BrstPos = BrstPos – BrstOffst
                    else BrstPos = BrstPos + BrstOffst
        MeasuredPosition = BrstPos + CylCd
    else
        MeasuredPosition = CylCd
```

From Table 1, if the estimated rotational velocity of the disks is greater than or equal to a skip burst logic amount, the cylinder code is the value transmitted as the measured position, i.e., decode logic circuit 70 merely outputs the existing data head trajectory. Eight potential logic states are determined in decode logic circuit 70 or the software in Table 1 according to truth table 73, and the calculated ratio having a linear characteristic for any position across the disk is transmitted from decode logic circuit 70. Burst comparison complete indicator 72 indicates that all burst comparisons have been properly determined.

FIG. 6 presents the circuitry of the burst comparator circuit 69 of FIG. 5. Sequencer circuit 80 receives clock information from integer latch completion indicator 66, clock 67, and ADC integer read signal 68. These inputs provide timing and completion indications and sequence and coordinate the raw data manipulation within the circuit. First multiplexer 81 and second multiplexer 82 coordinate the raw data received from the head based on burst information signals received at different times the head scans over the burst transitions. Depending on the timing of the data received, first multiplexer 81 and second multiplexer 82 coordinate raw data received from first through fourth integer latches 62–65 and transmit multiplexed data to twelve bit magnitude comparator 83 twelve bit magnitude comparator 73 evaluates the multiplexed data and compares the relevant magnitudes of the transitions received at different times. Depending on the comparison being made of the four burst signals involved, data is transferred from twelve bit comparator 83 to the first through sixth gate 84–89.

For example, first through third integer latches 62–64 may transmit twelve bit data received from the data head to first multiplexer 71, which converts the raw data into a magnitude of a burst signal, such as burst signal B. Second multiplexer 82 converts other raw data into a second signal, such as burst signal D amplitude. When burst signals B and D have been received, a comparison is made in twelve bit magnitude comparator 83 and passed to fifth gate 88, and transmitted from fifth comparator output 94. First through sixth comparator outputs 81–85 then transmit the results of these comparisons, and when complete, transmit the indication of completion to burst comparison complete indicator 72.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A system for positioning a plurality of heads traversing a plurality of disks in a disk drive system, said positioning system including:

magnitude calculation means for computing a plurality of servo burst signal magnitudes based on head position relative to a plurality of transitions in each of a plurality of burst zones located on said disks, wherein said magnitude calculation means comprises:

detection means responsive to a head output signal received from the head for determining the magnitude of each burst read from said plurality of transitions; and wherein said detection means includes means for sampling multiple transitions when said head is positioned within each track; and signal determination means for:

calculating a head offset based on relative differences between said plurality of servo burst signal magnitudes and radial displacement of each head in each track and transmitting a signal equal to the ratio of the differences between the plurality of servo burst signal magnitudes, said ratio of magnitude differences based on radial displacement of the head, wherein said signal has a linear response for any head position on the disk.

2. The positioning system of claim 1, wherein said signal determination means further comprises a comparison circuit for calculating relative size of all servo burst magnitudes and a calculation circuit for calculating the ratio of the differences of servo burst magnitudes based on the relative size received from said comparison circuit.

3. The positioning system of claim 2, wherein said comparison circuit comprises:

a magnitude comparator circuit;

at least one multiplexing circuit transmitting data to the magnitude comparator circuit; and a sequencing circuit attached to said multiplexing circuits to determine the order of operation of the multiplexing circuits.

4. A system for positioning a plurality of heads traversing a plurality of disks in a disk drive system, said positioning system including:

magnitude calculation means for computing a plurality of servo burst signal magnitudes based on head position relative to a plurality of transitions in each of a plurality of burst zones located on said disk; and signal determination means for:

calculating a head offset based on relative differences between said plurality of servo burst signal magnitudes and radial displacement of each head in each track and transmitting a correction signal equal to the ratio of relative burst signal magnitude differences, wherein said correction signal has a linear response for any head position on the disk.

5. The positioning system of claim 4, wherein said signal determination means comprises calculating a ratio of the differences between the plurality of servo burst signal magnitudes based on radial displacement of the head.

6. The positioning system of claim 5, wherein said system comprises at least four burst zones each having at least two transitions located along each concentric track.

7. The positioning system of claim 5, wherein said magnitude calculation means comprises detection means responsive to a head output signal received from the head for determining the magnitude of each burst read from said plurality of transitions, wherein said detection means includes means for sampling multiple transitions when said head is positioned substantially centrally within each track.

8. The positioning system of claim 5, wherein said signal determination means further comprises a comparison circuit for calculating relative size of all servo burst magnitudes and a calculation circuit for calculating the ratio of the differences of servo burst magnitudes based on the relative size received from said comparison circuit.

9. The positioning system of claim 8, wherein said comparison circuit comprises:

a magnitude comparator circuit;

at least one multiplexing circuit transmitting data to the magnitude comparator circuit; and a sequencing circuit attached to said multiplexing circuits to determine the order of operation of the multiplexing circuits.

10. The positioning system of claim 9, wherein said signal determination means does not transmit a correction signal if disk rotation velocity exceeds a predetermined value.

11. The positioning system of claim 5, wherein radial displacement of the head outside a predetermined boundary causes a transition of said signal determination means and separate ratios based on alternate servo burst magnitudes are calculated by said signal determination means.

12. A method for determining the head position on a disk having a plurality of concentric tracks in a hard disk drive system, comprising the steps of:

computing a plurality of servo burst signal magnitudes based on head position relative to a plurality of transitions in each burst zone; and calculating a head offset based on relative differences between said plurality of servo burst signal magnitudes and radial displacement of each head in each track and transmitting a correction signal equal to the ratio of relative burst signal magnitude differences, wherein said correction signal has a linear response for any head position on the disk.

13. The method for determining head position of claim 12, wherein said position determining step comprises calculating a ratio of the differences between the plurality of servo burst signal magnitudes based on radial displacement of the head.

14. The method for determining head position of claim 12, wherein said allocating step comprises:

designating at least four burst zones; and marking at least five transitions along each concentric track.

15. The method for determining head position of claim 12, wherein said computing step comprises detecting a head output signal to determine the magnitude of each burst read from said plurality of transitions, and wherein said detecting step includes sampling multiple transitions when said head is positioned substantially centrally within each track.

16. The method for determining head position of claim 12, wherein said calculating step further comprises ascertaining relative size of all servo burst magnitudes and finding the ratio of the differences of servo burst magnitudes based on the relative size received from said ascertaining step.

17. The method for determining head position of claim 12, wherein radial displacement of the head outside a predetermined boundary causes said head offset calculation step to transition and determine separate ratios based on alternate servo burst magnitudes.

18. A system for positioning read/write heads in a disk drive system, said positioning system comprising:

a magnitude detection circuit which detects servo burst signal magnitudes when each head is positioned within disk tracks; and a signal determination circuit which calculates a head offset based on a ratio of differences between servo burst signal magnitudes, said ratio based on radial head displacement within each disk track, and transmits a signal equal to the ratio of the differences between the plurality of servo burst signal magnitudes, said ratio of burst signal magnitudes based on radial displacement of the head, wherein said signal has a linear response for any head position on any disk.

19. The system of claim 18, wherein said signal determination circuit further comprises a comparison circuit for calculating relative size of all servo burst magnitudes and a calculation circuit for calculating the ratio of the differences of servo burst magnitudes based on the relative size received from said comparison circuit.

20. The system of claim 19, wherein said comparison circuit comprises:

a magnitude comparator circuit;

at least one multiplexing circuit transmitting data to the magnitude comparator circuit; and a sequencing circuit attached to said multiplexing circuits to determine the order of operation of the multiplexing circuits.

* * * * *